United States Patent
Jacobs, II

(10) Patent No.: US 11,636,513 B2
(45) Date of Patent: Apr. 25, 2023

(54) SYSTEM FOR PROVIDING PRICING INFORMATION IN A CAD A PRODUCT PROGRAM

(71) Applicant: DESPREZ, LLC, Nashua, NH (US)

(72) Inventor: James L. Jacobs, II, Nashua, NH (US)

(73) Assignee: Desprez, LLC, Nashua, NH (US)

( * ) Notice: Subject to any disclaimer, the term of this patent is extended or adjusted under 35 U.S.C. 154(b) by 105 days.

(21) Appl. No.: 16/588,878

(22) Filed: Sep. 30, 2019

(65) Prior Publication Data

US 2020/0034877 A1    Jan. 30, 2020

Related U.S. Application Data

(63) Continuation of application No. 14/457,758, filed on Aug. 12, 2014, now Pat. No. 10,460,342.

(51) Int. Cl.
*G06Q 30/00*   (2012.01)
*G06Q 30/0251*   (2023.01)

(52) U.S. Cl.
CPC ............... *G06Q 30/0251* (2013.01)

(58) Field of Classification Search
CPC ...................... G06Q 30/0207–0277
See application file for complete search history.

(56) References Cited

U.S. PATENT DOCUMENTS

| | | | | |
|---|---|---|---|---|
| 6,021,403 A * | 2/2000 | Horvitz | ............... | G06N 5/00 |
| | | | | 706/45 |
| 8,880,629 B1 * | 11/2014 | Henrick | ............... | H04L 51/04 |
| | | | | 709/206 |
| 2006/0253214 A1 * | 11/2006 | Gross | ............... | G06F 30/00 |
| | | | | 705/26.1 |
| 2007/0043632 A1 * | 2/2007 | Abelow | ............... | G06Q 30/0633 |
| | | | | 705/26.8 |
| 2007/0050268 A1 * | 3/2007 | Han | ............... | G06Q 30/0625 |
| | | | | 705/26.62 |
| 2013/0046641 A1 * | 2/2013 | DeVree | ............... | G06Q 30/02 |
| | | | | 705/14.69 |
| 2013/0326354 A1 * | 12/2013 | Anderson | ............... | G06Q 30/0241 |
| | | | | 715/733 |
| 2014/0373049 A1 * | 12/2014 | Carr | ............... | H04N 21/812 |
| | | | | 725/34 |
| 2015/0142571 A1 * | 5/2015 | Moczydlowski | .. | G06Q 30/0261 |
| | | | | 705/14.58 |

* cited by examiner

*Primary Examiner* — Kambiz Abdi
*Assistant Examiner* — Christopher Stroud
(74) *Attorney, Agent, or Firm* — Caldwell Intellectual Property Law

(57) ABSTRACT

Methods and software that allow one or more users to utilize targeted-advertising functionality in the context of a product program. For example, such logistical functionality may enable users to benefit from the use of one or more functionalities enabled by targeted advertising, such as fully or partially ad-sponsored software, relevant training or assistance recommendations, and user-customized advertising, among others. Various corresponding and related methods and software are described.

17 Claims, 5 Drawing Sheets

SYSTEM FOR PROVIDING PRICING INFORMATION IN A CAD A PRODUCT PROGRAM

CROSS-REFERENCE TO RELATED APPLICATIONS

This application is a continuation of Non-provisional application Ser. No. 14/457,758, filed on Aug. 12, 2014 and entitled "METHODS AND SOFTWARE FOR PROVIDING TARGETED ADVERTISING TO A PRODUCT PROGRAM," the entirety of which is incorporated herein by reference.

FIELD OF THE INVENTION

The present invention generally relates to the field of targeted advertising. In particular, the present invention is directed to methods and software for providing targeted advertising to a product program.

BACKGROUND

Presently, computer-aided design (CAD) programs allow users (referred to as "designers" herein) to create computer models of products to be manufactured. After a design is complete, the designer typically then seeks out one or more suppliers to which they may send one or more design specifications and requests for pricing in order to obtain one or more prices or price quotes for fabricating the designed structure. After producing appropriate pricing, the suppliers transmit the pricing to the designer, who then chooses a supplier, typically primarily as a function of their provided pricing, to manufacture structures associated with the design specifications. As part of the design and manufacturing phases of one or more projects, designers, suppliers, and other associated users may utilize enterprise resource planning (ERP) software, material resource planning (MRP) software, and/or product lifecycle management (PLM) software to inform decisions and maintain efficiency in their businesses. However, when a user experiences difficulty with one or more aspects of CAD, ERP, MRP, PLM, or other software, the user typically must review lengthy user manuals for solutions, contact a support representative or coworker for assistance, and/or work through the difficulty independently, which can decrease productivity for the user and overall efficiency for any businesses with which the user is associated. Further, users may not have the requisite knowledge, experience, or supervision to be able to identify their own difficulties or inefficiencies in using particular software applications or systems. Such inefficiencies can be particularly troublesome, because they can become endemic inefficiencies in an organization, particularly when users with such unidentified inefficiencies are responsible for training new employees or producing training materials.

SUMMARY OF THE DISCLOSURE

In an aspect, a system for providing advertising targeted to user actions in a computer-assisted design ("CAD"") product program, includes a computing device implementing targeted-advertising software to perform the steps of receiving, at a CAD program, end-user usage data describing a user action in the CAD program, wherein the user action includes at least an instruction for the CAD program to perform an action; identifying, in an advertisement trigger database linking user actions to advertisement triggers, an advertisement trigger from the end-user usage data; determining that the advertisement trigger exceeds a threshold stored in an advertisement event database linking advertisement triggers to advertisement types; selecting, from an advertisement database linking advertisement triggers to advertisement types, an advertisement type; receiving, over a network, a first advertisement as a function of the advertisement type, wherein the advertisement relates to the user instruction for the CAD program to perform the action; and displaying the first advertisement to the end-user in the CAD program.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
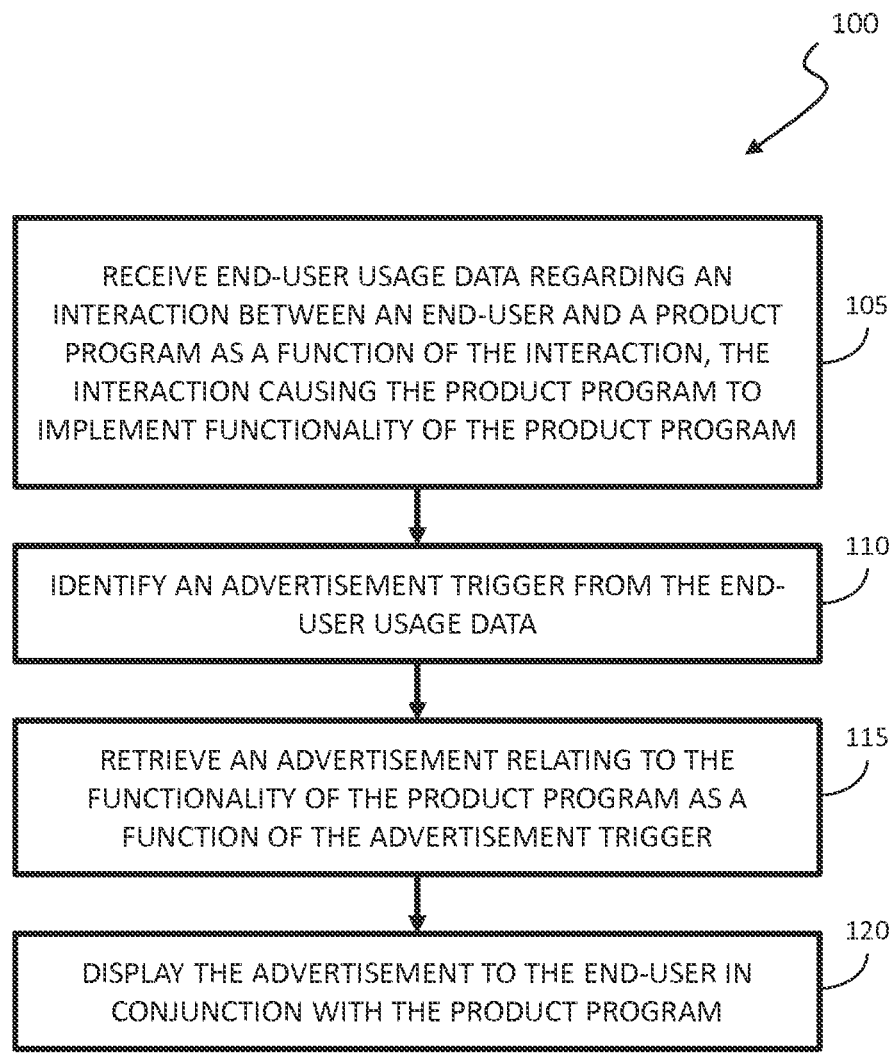
FIG. 1 is a flow diagram illustrating an exemplary method of providing targeted advertising to a product program.

Aspects of the present invention include methods and software for providing targeted advertising to a product program that may be implemented in a targeted-advertising computer system. In some embodiments, such a computer system may be operable to receive requests for pricing for fabricating structures represented and/or specified in a design and prices on projects associated with such requests. In the context of such embodiments, a price may include a price estimate, quote, bid, and/or a firm fixed quote or cost, among other monetary amounts. Examples of structures that may be specified and/or represented in a design include a solid metal cube, an electronic-device chassis formed from sheet metal, an injection molded plastic toy, an article of apparel or clothing such as a shirt made from cotton, and a shelving unit consisting of various parts, among a virtually limitless list of other structures. Fundamentally, there is no limitation on the type of structure that may be represented and/or specified in a design associated with the present invention. In some embodiments, methods and software of the present disclosure enable product program end-users, which may comprise fabrication pricing requesters (such as designers or purchasing agents associated with designers, among others, referred to collectively as "designers" herein) and fabricators/manufacturers (referred to as "suppliers" herein), to benefit from the use of one or more functionalities enabled by targeted advertising, such as fully or partially ad-sponsored software, relevant training or assistance recommendations, and user-customized advertising, among others, in the context of a product program, such as, but not limited to, a CAD, ERP, MRP, or PLM program.

In some embodiments, appropriate targeted advertising can be determined by targeted-advertising software as a function of usage data regarding one or more interactions between an end-user and a product program. For example, in a CAD-based product program that includes design-creating tools, if an auto-correct feature corrects more than a certain number of errors made by the user and/or if the user performs more than a certain number of correction or delete commands, an advertisement for a CAD-training course may be displayed to the user such that the user can recognize their potential inefficiency and seek additional training to improve their efficiency. In order to provide the functionality described, methods and software disclosed herein may be implemented in a targeted-advertising software system accessible by designers, suppliers, and/or other users, as appropriate. Targeted advertisements may be generated independently by targeted-advertising software or retrieved/received from one or more advertisers operating independently from such software. Though methods disclosed herein may be utilized in the context of a virtually limitless number of product programs, in some embodiments, targeted-advertising software may present advertisements to designers in the course of their designing and submitting project specifications and requests for pricing directly to the targeted-advertising software system or another system via, for example, an Internet browser or indirectly through a CAD program or other system capable of interfacing with the system and communicating designs thereto. Similarly, such targeted-advertising software may present advertisements to suppliers in the course of their accessing the targeted-advertising system directly through an Internet browser or indirectly through, for example, a supplier's in-house system in order to review available projects and transmit prices to designers or other users or entities associated with such projects.

Figure 2:
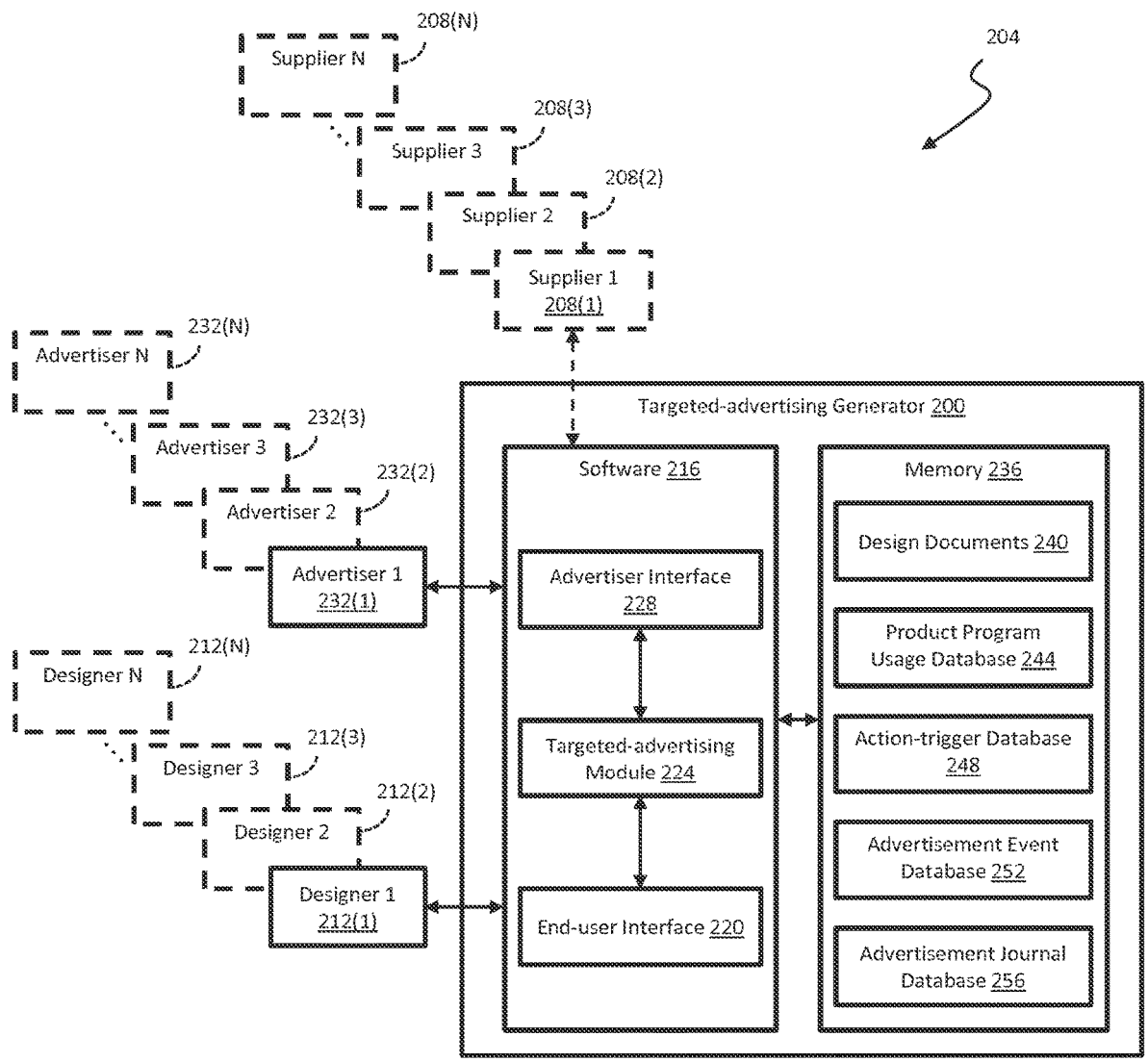
FIG. 2 is a high-level block diagram illustrating an exemplary targeted-advertising software system that may be used to implement the method of FIG. 1.

Turning now to the drawings, FIG. 1 illustrates an exemplary method 100 of providing targeted advertising in a product program. Method 100 may be implemented in a targeted-advertising generator, such as in exemplary targeted-advertising generator 200, within a computer-implemented targeted-advertising software system 204, as illustrated in FIG. 2, using a computing system, such as computing system 500 of FIG. 5 or a network of such or similar computing systems (e.g., a wide-area network, a global network (such as the Internet), and/or a local area network, among others), that is generally: 1) programmed with instructions for performing steps of a method of the present disclosure; 2) capable of receiving and/or storing data necessary to execute such steps; and 3) capable of providing any user interface that may be needed for a user to interact with the system, including setting the system up for generating targeted advertisements and/or presenting targeted advertisements to end-users of product programs, among other things. Those skilled in the art will readily appreciate that aspects of the present disclosure can be implemented with and/or within any one or more of numerous devices, ranging from self-contained devices, such as a smartphone, tablet, computer, laptop computer, desktop computer, server, or web-server, to a network of two or more of any of these devices. Fundamentally, there is no limitation on the physical construct of the targeted-advertising software system, as long as it can provide one or more of the features and functionality described herein. For example, one or more aspects of targeted-advertising generator 200 may be contained within and/or implemented by one or more supplier's, designer's, and/or advertiser's in-house systems, a CAD program, a centralized server, or a decentralized network of devices and/or software, among other implementations that will become readily apparent after reading this disclosure in its entirety. In some embodiments, depending on specific implementation, one or more steps of method 100 and/or any other method(s) incorporating features/functionality disclosed herein may be implemented substantially in real-time.

Prior to describing exemplary method 100, parts of targeted-advertising software system 204 will first be described to provide an exemplary context for method 100. Referring to FIG. 2, system 204 may optionally include a plurality of suppliers 208(1) to 208(N), such as "Supplier 1" 208(1), "Supplier 2" 208(2), and "Supplier 3" 208(3), and up to any number of suppliers (designated by "Supplier N" 208(N)), that may associate one or more prices with or cause one or more prices to be generated by pricing software for one or more projects provided to targeted-advertising generator 200 by one or more designers 212(1) to 212(N), such as "Designer 1" 212(1). As a particular non-limiting example, suppliers 208(1) to 208(N) may comprise one or more fabricators of sheet-metal parts, while designers 212(1) to 212(N) may comprise one or more entities that design sheet-metal parts and/or assemblies of parts, purchasing agents associated with such entities, or customers of such entities or other users or entities that wish to generate a price for a particular design. In this example, targeted-advertising generator 200 is configured to allow designers 212(1) to 212(N) to each submit one or more requests for pricing for fabrication projects associated with one or more designs and to allow any one or more of suppliers 208(1) to 208(N), such as Supplier 1 208(1) for instance, to provide a pricing for, or to cause pricing software to provide a pricing for, any one or more of the projects in the marketplace that is/are open for bidding or other pricing. In this example, targeted-advertising generator 200 may present targeted advertisements to such users throughout each of these processes, among others, as appropriate.

In the context of exemplary targeted-advertising generator 200 of FIG. 2, aspects of the present invention are implemented in software 216, which in this example provides an end-user interface 220, such as a graphical user interface, operable to allow each user, such as supplier 208(1) to 208(N) and designer 212(1) to 212(N), among others, to interact with the targeted-advertising generator. Additionally or alternatively, end-user interface 220 may comprise a basic software interface allowing each user to utilize in-house software, such as one or more CAD software applications, perhaps with custom interfaces, to interact with targeted-advertising generator 200. In some embodiments, end-user interface 220 may allow targeted-advertising generator 200 to automatedly transmit and/or retrieve information from one or more users or entities associated with the generator, such as one or more advertising services (e.g., Google AdWords®), as such may be required for generating relevant advertisements and/or preferred for reducing any delays that may otherwise arise.

Software 216 may additionally be considered to include a targeted-advertising module 224 and an advertiser interface 228. Notably, in some embodiments, portions of software 216 may be distributed among separate systems. For example, a designer's CAD program may comprise an end-user interface that interfaces with or generates data to be communicated to targeted-advertising module 224 that may be located at a separate location, such as a centralized server. Targeted-advertising module 224 may execute various operations and calculations required to provide targeted advertising as a function of interactions between an end-user and a product program. As will be understood by reading this entire disclosure, operations and targeted-advertising that targeted-advertising module 224 can be configured to perform and provide, respectively, are varied and diverse. It is noted that while the term "module" is used herein, this term is not intended to require any particular configuration of the corresponding software code. For example, "module" should not be construed to mean that the software code is embodied in a discrete set of code independent of the software code for software 216. Rather, the term "module" is used herein merely as a convenient way to refer to the underlying functionality.

Similarly to end-user interface 220, advertiser interface 228 may provide a graphical user interface operable to allow one or more advertisers 232(1) to 232(N), such as "Advertiser 1" 208(1), "Advertiser 2" 208(2), and "Advertiser 3" 208(3), and up to any number of advertisers (designated by "Advertiser N" 208(N)), which may comprise advertising agencies, software businesses, or any other entities interested in providing advertisements, to interact with targeted-advertising generator 200. Additionally or alternatively, advertiser interface 228 may comprise a software interface allowing each advertiser 232(1) to 232(N) to utilize in-house software, in some embodiments with custom interfaces, to interact with a targeted-advertising generator 200. In some embodiments, advertisers may interact with targeted-advertising generator 200 via advertiser interface 228 in order to configure advertisements to be presented to end-users associated with the targeted-advertising generator. Additionally or alternatively, targeted-advertising generator 200 may automatedly interface with advertisers 232(1) to 232(N) in order to receive and/or retrieve advertisements and/or advertisement configurations from the advertisers (e.g., Google AdWords®). As with end-user interface 220, in some embodiments, advertiser interface 228 may allow targeted-advertising generator 200 to automatedly transmit and/or retrieve information from one or more advertisers, as such may be required for generating targeted advertising and/or preferred for reducing any delays that may otherwise arise. Notably, although end-user interface 220 and advertiser interface 228 are shown in FIG. 2 and described herein as separate components, they may be combined into a single interface in some embodiments.

Targeted-advertising generator 200 may also include a memory 236 that holds and/or stores a variety of information, including, but not limited to, design documents 240, product program usage database 244, action-trigger database 248, advertisement event database 252, and advertisement journal database. Design document(s) 232 may comprise one or more designs, each of which may include one or more CAD models, such as 2D or 3D CAD models, among others, and may contain one or more records of various geometric and/or feature data associated with one or more designs and/or CAD models. Design documents may additionally or alternatively contain a bill of materials (BOM) listing one or more CAD models, such as one or more user custom-designed CAD models, and/or products purchased from a catalog (such as one or more particular nuts, studs, motors, and/or keypads, among others), which may or may not be represented as a CAD model within the structure's assembly level CAD model. Each design document may include, for example, a CAD file or other document specifying or otherwise including information regarding one or more CAD models or designs; however, to be clear, design documents need not necessarily include any CAD models and may instead consist exclusively of a parts list, BOM, or other non-CAD-related information.

Product program usage database 244 may comprise actions taken by individual users or groups of users in the course of using one or more product programs and may also comprise durations or time-stamps corresponding to each action. For example, a product program, in-house system, CAD program, or other software capable of interacting with targeted-advertising generator 200 may communicate actions derived from usage of a product program, such as a CAD program, by a designer, such as Designer 1 212(1), to product program usage database 244, either directly or through advertiser interface 228 and/or targeted-advertising module 224. Such actions may comprise product program commands, such as "undo" commands or "place weld" commands, among others, as well as key-presses, mouse-clicks, or statistical or other information derived therefrom. As a function of such actions, targeted-advertising module 224 may determine a user's mood, such as whether a user is aggravated, excited, or happy, among others, and then identify advertisements to present to the user as a function of their mood. In some embodiments, targeted-advertising generator 200 may link usage of a plurality of users of one or more product programs in order to determine targeted advertising for each of such a plurality of users. Users or administrators of targeted-advertising generator 200 may configure such links manually or cause the targeted-advertising generator to automatedly configure such links by prompting users for and/or analyzing user information such as social media accounts or usage, business relationships derived from user e-mail activity or professional networks, network addresses, and/or geographical locations, among others. This functionality can help targeted-advertising generator 200 to identify patterns in groups of users such that the targeted-advertising generator may provide relevant targeted-advertising to such users.

Action-trigger database 248 may comprise a list of actions that users may take in the course of using one or more product programs and corresponding advertising triggers that targeted-advertising module 224 may utilize to determine appropriate targeted advertising for each user. For example, a particularly hard tap on a touchpad may correspond to a trigger associated with user frustration. Notably, more than one action may correspond to a single trigger and more than one trigger may correspond to a single action. As such, for example, a consecutive series of backspace or delete commands may correspond to a trigger associated with typing efficiency as well as a trigger associated with user frustration.

Advertisement event database 252 may comprise a list of triggers and specifications for how targeted-advertising generator 200 may utilize advertising triggers. For example, advertisement event database 252 may specify whether a trigger should automatically generate an advertisement, how often a trigger should generate an advertisement, a duration of time that a trigger should be active or repeatedly detected before generating an advertisement, a number of triggers that should be detected before generating an advertisement, a duration of time that an advertisement corresponding to a particular trigger should be presented to a user, and/or advertisement types associated with each trigger. Advertisement event database 252 may further comprise a rank associated with each trigger and/or type of trigger in order to enable targeted-advertising generator 200 to determine which advertisement to display when there is a conflict. For example, such a rank may act as a tiebreaker in the case that two or more advertisements are triggered concurrently or sequentially such that the advertisements would otherwise overlap in time or a first advertisement would be cut short by a second advertisement. Further triggers may correspond to actions that result in design documents that targeted-advertising generator 200 may mathematically determine to utilize imperfect implementations of the "golden ratio," clashing or non-complementary colors, or other aesthetic design principles and may be associated with aesthetic-based advertisements and/or cause such advertisements to be presented to a user. Additionally, general computer usage, such as playing games or browsing social media or other websites, may generate triggers. For example, time-wasting behavior could be an indication of a user getting discouraged, and, as such, advertisement event database 252 may associate triggers associated with time-wasting behavior with design course or other product program tutorial advertisements. In some embodiments, triggers may be generated by users taking such a tutorial, utilizing information learned from the tutorial, and then reducing usage of such information; this may indicate that the user is ready for a new or refresher lesson. Further, in addition or as an alternative to analyzing user actions, targeted-advertising generator 200 may utilize information such as browser cookies, file directories, and social media history, among others, in order to determine appropriate targeted advertisements.

Advertisement journal database 256 may comprise a record of advertisements presented to a user or group of users, triggers generated by a user or group of users, advertisement counts for a user or group of users, and any user feedback related to one or more advertisements. Such user feedback may comprise passive feedback, such as an indication of how long the user viewed an advertisement or whether a user clicked or otherwise responded to an advertisement, as well as active feedback, such as a user may provide directly to targeted-advertising generator 200, such as via end-user interface 220, and/or indirectly to the targeted-advertising generator, for example, through a product program or e-mail, among others. In one example, a user may select a "give feedback" user interface element in end-user interface 220 and targeted-advertising generator 200 may prompt the user for feedback regarding a currently or recently presented advertisement. Targeted-advertising generator 200 may then utilize such feedback and, additionally or alternatively, any other feedback, such as how long a user or group of users viewed one or more advertisements, whether a user or group of users clicked on or otherwise responded to one or more advertisements, etc., to produce targeted-advertising. Such targeted-advertising may be customized to user or user-group preferences by, for example, presenting more advertisements or types of advertisements associated with positive feedback and fewer advertisements or types of advertisements associated with negative feedback. Similarly, targeted-advertising generator 200 may select more or fewer advertisements related to advertisements that users have viewed for longer durations than other advertisements or that have been presented to users a greater number of times than other advertisements, depending on the configuration of the generator and the user's preferences. In some embodiments, this functionality may be enabled by interfacing with advertisement journal database 256. In some embodiments, advertisement journal database 256 may be embedded in or otherwise associated with one or more particular CAD files or design documents.

It is noted that although the various components of memory 236 are shown in FIG. 2 and described herein as separate components, they may be implemented as a single component or database. Similarly, although databases in memory 236 are shown in FIG. 2 and described herein as individual databases, each may comprise two or more databases, as appropriate. For example, product program usage database 244 may comprise a database or group of databases, one for each user of targeted-advertising generator 200, among myriad other implementations that will be readily apparent to one of ordinary skill in the art after reviewing this disclosure in its entirety.

End-user interface 220 may be designed and configured to allow users, such as designers 212(1) to 212(N), to submit information or otherwise interact with targeted-advertising generator 200, in some embodiments including providing each user the ability to upload or otherwise communicate a request for pricing and/or design documents and to provide any other information, such as a unique identifier for a particular user or group of users, and/or one or more user preferences, such as preferred advertisements or advertisement types, among others, which targeted-advertising module 224 may utilize to determine appropriate advertising. Targeted-advertising generator 200 may then communicate user-provided information or otherwise make the information available to one or more aspects of the targeted-advertising generator, such as targeted-advertising module 224, advertiser interface 228, design documents 240 and/or other components of memory 236, and/or end-user interface 220. End-user interface 220 may be further designed and configured to allow any of suppliers 208(1) to 208(N) to submit prices in response to pricing solicitations associated with design documents uploaded or otherwise shared with, or otherwise interact with, targeted-advertising generator 200, including providing each supplier the ability to upload prices or other information. Notably, after a designer has submitted design documents directly or indirectly to a supplier, targeted-advertising module 224 may present advertisements to the supplier based on such design documents and/or present advertisements to the supplier that were presented to a designer associated with the design documents. This functionality can be enabled, for example, by advertisement journal database 256 being embedded in or otherwise associated with one or more particular CAD files or design documents. In some embodiments, one or more users, such as one or more designers 212(1) to 212(N) and/or one or more suppliers 208(1) to 208(N), may specify via end-user interface 220 whether they wish to enable or disable targeted-advertising through targeted-advertising module 224. In such embodiments, targeted-advertising module 224 may award points, such as advertising credits, and/or monetary earnings to users who choose to enable targeted-advertising through targeted advertising module 224, optionally as a function of an amount of time the user spends viewing ads, a number of ads the user views, and/or a number of ads the user actually clicks or otherwise selects.

Advertiser interface 228 may be designed and configured to allow users, such as advertisers 232(1) to 232(N), to submit information or otherwise interact with targeted-advertising generator 200, in some embodiments including providing each user the ability to upload or otherwise communicate advertisements and/or advertisement configurations and to provide, as well as any other information, such as a unique identifier for a particular advertiser or group of advertisers, and/or one or more advertiser preferences, such as preferred market sectors or segments, among others, which targeted-advertising module 224 may utilize to determine appropriate advertising. For example, an advertiser, such as Advertiser 1 232(1), may communicate a preference to targeted-advertising generator 200 that their preferred market sector is industrial CAD design; the targeted-advertising generator may then direct advertisements from Advertiser 1 primarily to users identified or identifiable as working in industrial CAD design. After an advertiser provides such information to advertiser interface 228, targeted-advertising generator 200 may communicate the information or otherwise make the information available to one or more aspects of the targeted-advertising generator, such as targeted-advertising module 224, advertiser interface 228, one or more appropriate components of memory 236, and/or end-user interface 220.

Memory 236 may represent any part or the entirety of the memory used by targeted-advertising generator 200 in providing its functionality. Depending upon the particular implementation at issue, memory 236 may be volatile memory, such as primary storage memory (e.g., random-access memory (RAM) or cache memory, etc.), non-volatile memory, such as secondary storage memory (e.g., a magnetic drive, optical drive, etc.), and any combination thereof and in any number of memory devices. In embodiments wherein targeted-advertising generator 200 undertakes the task to collect and store information from users, such as product program usage, user information, etc., memory 236 will typically be one or more secondary storage devices. In embodiments wherein targeted-advertising generator 200 collects data in real-time, such as from current user activity or from data stores of one or more individual users or groups of users in conjunction with generating targeted advertising, memory 236 may only need to be a primary memory. Those skilled in the art will readily understand the types of memory(ies) needed for memory 236 for any particular instantiation of a targeted-advertising generator of the present invention.

For the sake of completeness, it is noted that the unlabeled arrows in FIG. 2 represent temporary and/or permanent data connections that enable data communication between various components of targeted-advertising generator 200. These connections may be implemented in the form of, for example, data buses, Internet connections, local network connections, and/or any other connections between electronic devices or portions of one or more devices.

With the context of targeted-advertising software system 204 established and referring again to FIG. 1, and also FIG. 2, method 100 may begin at step 105 at which software 216, such as targeted-advertising module 224, of targeted-advertising generator 200 may receive end-user usage data regarding an interaction between an end-user and a product program as a function of the interaction, the interaction causing the product program to implement functionality of the product program. In some embodiments, one or more components of software 216 may solicit such information or other information, such as user preferences, by displaying a set of options to the user such that the user can provide a selection of one or more options, which the software may apply to a specified subset of or all product programs or advertisements for the user. Though it is emphasized that any user, such as a designer or supplier, among others, may utilize targeted-advertising generator 200 to receive targeted advertising, for the convenience of presenting a concrete, yet simple, example, method 100 will be described primarily in the context of targeted-advertising generator 200 presenting advertisements to Designer 1 212(1). In the context of step 105, for example, a CAD program used by Designer 1 212(1) may communicate usage data regarding an interaction between Designer 1 and the CAD program to targeted-advertising generator 200 via end-user interface 220 as a function of the interaction (e.g., a selection in the CAD program may cause the CAD program to transmit usage data to the end-user interface), the interaction causing the product program to implement functionality of the product program (e.g., the selection in the CAD program causing the CAD program to perform a function). Targeted-advertising generator 200 may then store the usage data in product program usage database 244.

At step 110, software 216, such as targeted-advertising module 224, may identify an advertisement trigger from the end-user usage data received at step 105. For example, if a user loads a design document into a product program or design documents 240, causes a product program to perform a function, such as launching the program, saving a design document, or changing a mode, or even provides no input while a product program is active (e.g., when no screensaver is active and the product program window is displayed), among other actions that a user may perform or neglect to perform, targeted-advertising module 224 may identify a trigger from such usage, which targeted-advertising generator 200 may store in product program usage database 244. In some embodiments, targeted-advertising module 224 may analyze a design document in order to identify an advertisement trigger based on the contents of the design documents. For example, if a design documents specifies a certain number of welds, targeted-advertising module 224 may identify a welding advertisement trigger from its analysis of the design document. As another example, if a design document specifies a large number of threaded holes, targeted-advertising module 224 may identify a screw or bolt advertisement trigger from its analysis of the design document. As mentioned previously, action-trigger database 248 may store a correspondence between user actions, which may include inactions or neglected actions, and triggers.

At step 115, software 216, such as targeted-advertising module 224, may retrieve an advertisement relating to the functionality of the product program as a function of the advertisement trigger. For example, targeted-advertising module 224 may refer to advertisement event database 252 to determine whether to present an advertisement to a user after identifying a trigger at step 110. At step 120, software 216, such as targeted-advertising module 224, may display or otherwise present the advertisement to the end-user in conjunction with the product program. For example, a CAD user may place a weld, which action-trigger database 248 may identify as a trigger, and if targeted-advertising module 224 determines that presenting an advertisement to the user would be appropriate by interfacing with advertisement event database 252, the targeted-advertising module may retrieve and advertisement relating to placing a weld as a function of the configuration of the advertisement event database. Advertisements may be stored in memory 236 or retrieved or received from one or more advertisers, such as Advertiser 1 232(1) via advertiser interface 228, when and as appropriate. In some embodiments, targeted-advertising module 224 may display advertisements or cause a program product to display advertisements in a dedicated display area in a product program. For example, while a CAD program is rendering or saving a model, targeted-advertising module 224 may present an advertisement in a progress bar, the advertisement being optionally revealed as the progress bar progresses. In some embodiments, targeted-advertising module 224 may display advertisements or cause a program product to display advertisements on or as part of a user-created or user-influenced portion, such as a CAD model, of the display of a program product.

It is noted that while steps 105, 110, 115, and 120 have been described in a particular order for the sake of illustration, those skilled in the art will understand that the described order is not necessarily the only ordering for these steps. Rather, the only order necessary for this method and other methods disclosed herein is the order imposed by necessity. For example, targeted advertisements cannot be offered to a user before at least one appropriate advertisement has been identified. It is also noted that the steps illustrated are only the steps needed to illustrate certain aspects of the invention and that other steps, such as steps of retrieving and storing information, may be utilized in conjunction with performing the steps illustrated as needed for embodying a particular implementation.

Figure 3:
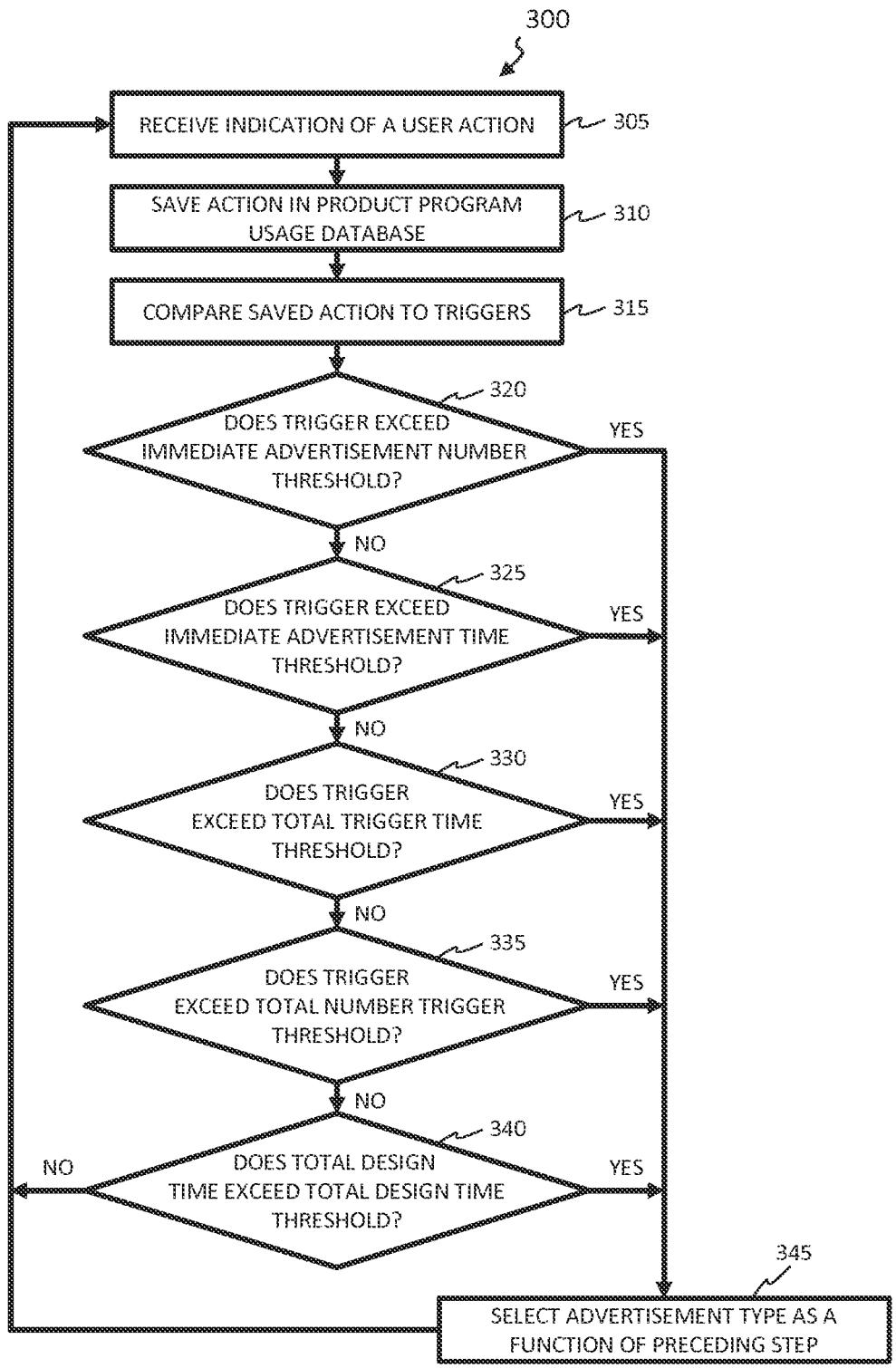
FIG. 3 is a flow diagram illustrating a particular method of selecting an advertisement in a targeted-advertising software system.

FIG. 3 illustrates one method 300 targeted-advertising module 224 may utilize in order to select an advertisement. At step 305, targeted-advertising module 224 may receive an indication of a user action, such as via end-user interface 220. At step 310, targeted-advertising module 224 may store an indication of the user action in product program usage database 244. At step 315, targeted-advertising module 224 may compare the user action to triggers specified by action-trigger database 248. If targeted-advertising module 224 identifies a trigger, it may then refer to advertisement event database 252 in order to accomplish one or more steps 320-345 of method 300. Notably, if multiple triggers are detected, they may be analyzed sequentially or simultaneously.

At step 320, targeted-advertising module 224 may determine whether the trigger exceeds an immediate advertisement number threshold for the trigger in advertisement event database 252, which may specify whether a number of triggers should be detected before generating an advertisement. At step 325, targeted-advertising module 224 may determine whether the trigger exceeds an immediate advertisement time threshold for the trigger in advertisement event database 252, which may specify a duration of time that a trigger should be active or repeatedly detected before generating an advertisement. At step 330, targeted-advertising module 224 may determine whether the trigger exceeds a total trigger time threshold for the trigger in advertisement event database 252, which may specify a cumulative duration of time that a trigger should be active or repeatedly detected before generating an advertisement. At step 335, targeted-advertising module 224 may determine whether the trigger exceeds a total number trigger threshold for the trigger in advertisement event database 252, which may specify a number of triggers that should be detected before generating an advertisement. At step 340, targeted-advertising module 224 may determine whether the trigger exceeds a total usage time threshold for the trigger in advertisement event database 252, which may specify a maximum duration of time that a user may use a product program before an advertisement should be presented.

If all of steps 320-340 return negative results, method 300 may return to step 305 or hand off execution to a separate process. However, if any one of steps 320-340 return a positive result, method 300 may proceed to step 345, at which targeted-advertising module 224 may select an advertisement or advertisement type as a function of the first of steps 320-340 that produced a positive result. For example, if a trigger associated with user frustration exceeds an immediate advertisement number threshold for the trigger stored in advertisement event database 252, targeted-advertising module 224 may select an advertisement related to user frustration that the user can select to immediately relieve their frustration. On the other hand, if a trigger associated with user frustration does not exceed an immediate advertisement number threshold or an immediate advertisement time threshold, but does exceed a total trigger time threshold for the trigger stored in advertisement event database 252, targeted-advertising module may select an advertisement related to user frustration that the user can select to begin to relieve long-lasting frustration. After reviewing this disclosure in its entirety, those of ordinary skill in the art will recognize that these are merely two examples of the virtually limitless combinations of triggers, thresholds, and advertisements that may be utilized with the present invention. For example, in some embodiments, a predetermined or dynamically-determined amount of time may be used as a threshold; in such embodiments, if no other trigger is detected within such an amount of time, targeted-advertising module 224 may select an advertisement as a function of a previously-presented advertisement and/or a previously-detected trigger.

For the convenience of presenting a concrete example, Table I contains entries like those that targeted-advertising module 224 or other components of system 204 may store in product program usage database 244 for a user using a CAD program. Notably, the sets of simultaneous actions performed at timestamps 12:18:20 and 12:35:28 may correspond to individual or separate actions that generate two separate triggers. Also notable is that the idle action at timestamp 12:35:40 is ongoing, hence the associated time fields are blank.

TABLE I

| Timestamp | Action | Total Time (minutes) | Associated Trigger | Total Trigger Time (minutes) | Total Number of Triggers | Total Design Time |
|---|---|---|---|---|---|---|
| 12:01:00 | Start Program | 0:02:23 | None | N/A | 0 | N/A |
| 12:03:23 | Load CAD File "Bracket.sw" | 0:00:49 | Sheet Metal | 0:00:49 | 1 | 0:02:23 |
| 12:04:12 | Idle | 0:11:49 | Frustrated | 0:11:49 | 1 | 0:03:12 |
| 12:16:01 | Activate Weld button | 0:00:14 | Weld | 0:00:14 | 1 | 0:15:01 |
| 12:16:15 | Place Weld (x1:x2, y1:y1, z1:z1) | 0:02:05 | Weld | 0:02:19 | 2 | 0:15:15 |
| 12:18:20 | Activate Undo button (1) | 0:00:05 | Frustrated | 0:11:54 | 2 | 0:17:20 |
| 12:18:20 | Activate Undo button (2) | 0:00:05 | Weld | 0:02:24 | 3 | 0:17:20 |
| 12:18:25 | Activate Weld button | 0:00:04 | Weld | 0:02:28 | 4 | 0:17:25 |
| 12:18:29 | Place Weld (x3:x2, y1:y1, z1:z1) | 0:02:19 | Weld | 0:04:47 | 5 | 0:17:29 |

TABLE I-continued

| Timestamp | Action | Total Time (minutes) | Associated Trigger | Total Trigger Time (minutes) | Total Number of Triggers | Total Design Time |
|---|---|---|---|---|---|---|
| 12:20:48 | Idle | 0:05:11 | Frustrated | 0:17:05 | 3 | 0:19:48 |
| 12:25:59 | Select Sub-Assembly | 0:02:16 | None | N/A | 0 | 0:24:59 |
| 12:28:15 | Change Material (Stainless Steel) | 0:00:27 | Stainless Steel | 0:00:27 | 1 | 0:27:15 |
| 12:28:42 | Open "Decorative" menu | 0:06:35 | Aesthetic | 0:06:35 | 1 | 0:27:42 |
| 12:35:17 | Select Filigree design # 7 | 0:00:11 | Aesthetic | 0:06:46 | 2 | 0:34:17 |
| 12:35:28 | Select plating option (Chromate) (1) | 0:00:12 | Aesthetic | 0:06:58 | 3 | 0:34:28 |
| 12:35:28 | Select plating option (Chromate) (2) | 0:00:12 | Plating | 0:00:12 | 1 | 0:34:28 |
| 12:35:40 | Idle | — | Frustrated | — | 4 | 0:34:40 |

Table II contains entries like those that targeted-advertising module 224 or other components of system 204 may store in action-trigger database 248 for a user using a CAD program.

TABLE II

| Action | Trigger |
|---|---|
| Idle | Frustrated |
| Activate Cut button | Cut |
| Place Cut | Cut |
| Activate Weld button | Weld |
| Place Weld | Weld |
| Place Curved Cut | Advanced Cut |
| Place Cut on Material > .05 in | Advanced Cut |
| Place Gas Tungsten Arc Weld | Advanced Weld |
| Activate Undo button | Frustrated |
| Activate Undo button | (previous action) |
| Change Material (Aluminum) | Aluminum |
| Change Material (Stainless Steel) | Stainless Steel |
| Open "Decorative" menu | Aesthetic |
| Select Filigree design | Aesthetic |
| Select plating option | Aesthetic |
| Select plating option | Plating |
| Open Web Browser | Frustrated |

Table III contains entries like those that targeted-advertising module 224 or other components of system 204 may store in advertisement event database 252 for a user using a CAD program. Notably, in this example, "Features" indicates a type of triggers, which comprises the "Purchased Parts," "Weld," "Advanced Weld," "Cut," and "Advanced Cut" triggers. In this example, the immediate advertisement number threshold is simply a "yes" or "no" condition. Accordingly, for the purposes of method 300, the immediate advertisement number threshold for a trigger can be considered to be exceeded if the trigger is detected and the immediate advertisement number threshold stored in advertisement event database 252 for the trigger is "N." It is emphasized that Tables I-III are merely examples of information that may be stored and/or utilized by targeted-advertising generator 200. For example, many other actions, triggers, advertisement types, and thresholds may be used than are explicitly enumerated in Tables I-III.

TABLE III

| Rank | Trigger | Immediate Advertisement Number Threshold (Y/N) | Immediate Advertisement Time Threshold (minutes) | Total Trigger Time Threshold (minutes) | Total Number Trigger Threshold | Advertisement Type |
|---|---|---|---|---|---|---|
| 1 | Total Design Time | N | — | 60 | — | Design courses, CAD courses |
| 2 | Features | | | | | |
| 3 | Purchased Parts | Y | 5 | 60 | 20 | Purchased parts suppliers |
| 4 | Weld | N | 7 | 45 | 30 | Expert assistance |
| 5 | Advanced Weld | Y | 5 | 60 | 30 | Welding shops |
| 6 | Cut | N | 7 | 20 | 10 | Expert assistance |
| 7 | Advanced Cut | Y | 5 | 30 | 10 | Sheet metal shops |
| 8 | Aesthetic | Y | 3 | 20 | 10 | Expert assistance, aesthetic hardware suppliers |

TABLE III-continued

| Rank | Trigger | Immediate Advertisement Number Threshold (Y/N) | Immediate Advertisement Time Threshold (minutes) | Total Trigger Time Threshold (minutes) | Total Number Trigger Threshold | Advertisement Type |
|---|---|---|---|---|---|---|
| 9 | Shipping | Y | 10 | 10 | 2 | Shipping coupons |
| 10 | Stainless Steel | Y | 3.5 | 15 | N/A | Stainless steel providers |
| 11 | Aluminum | Y | 3.5 | 15 | N/A | Aluminum providers |

Figure 4:
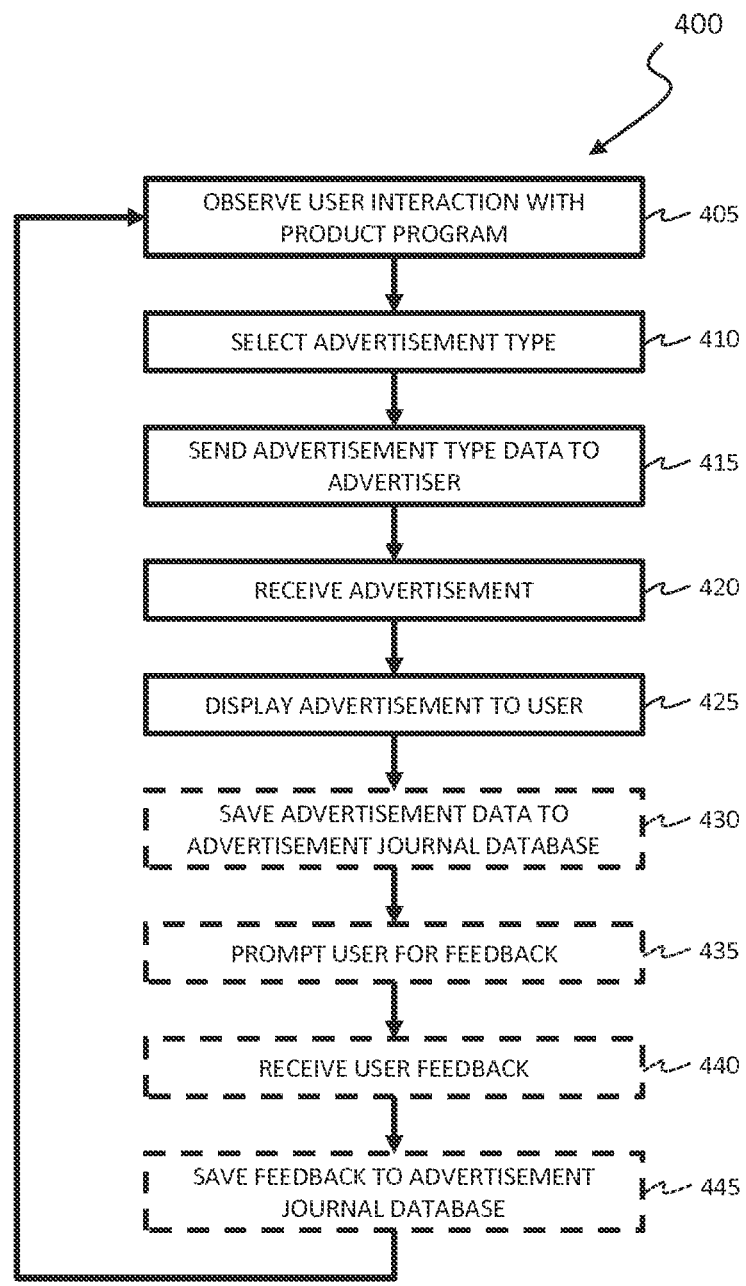
FIG. 4 is a flow diagram illustrating a particular method of providing targeted advertising to a product program by interfacing with an advertiser.

FIG. 4 illustrates one method 400 targeted-advertising module 224 may utilize in order to provide targeted advertising to a product program by interfacing with an advertiser. At step 405, targeted-advertising module 224 may observe a user interaction with a product program. At step 410, targeted-advertising module 224 may select an advertisement type as a function of the user interaction observed at step 405. At step 415, targeted-advertising module 224 may send advertisement type data to an advertiser, such as Advertiser 1 232(1), that may transmit an advertisement to targeted-advertising generator 200, such as via advertiser interface 228, as a function of the advertisement type data. At step 420, targeted-advertising module 224 may receive an advertisement from the advertiser associated with step 415. At step 425, targeted-advertising module 224 may display or otherwise present the advertisement received at step 420 to an end-user, such as via end-user interface 220. After step 425, method 400 may return to step 405, hand off execution to a separate process, or proceed to execute optional steps 430-445. At optional step 430, targeted-advertising module 224 may save advertisement data, such as the type of advertisement shown, the number of times or duration for which it has been shown, among other information, to advertisement journal database 256. At optional step 435, targeted-advertising module 224 may prompt the user for feedback regarding the advertisement, such as via end-user interface 220. At optional step 440, targeted-advertising module 224 may receive user feedback regarding the advertisement, again such as via end-user interface. At optional step 445, targeted-advertising module 224 may save any feedback received from the user at step 440 to advertisement journal database 256. After step 445, method 400 may return to step 405 or hand off execution to a separate process.

In some embodiments, targeted-advertising module 224 may interface with the Internet rather than with a particular advertiser, in which case steps 415-420 of method 400 may be replaced with steps of opening an Internet browser, automatically searching for advertisements using keywords associated with the advertising type selected at step 410, and loading advertisement results from the browser.

It is emphasized that methods 100, 300, and 400 are merely examples of the many ways that a skilled artisan may implement methods of implementing targeted-advertising functionality in a targeted-advertising software system. Those skilled in the art will readily be able to implement any suitable algorithm and/or calculation scheme within the framework of the present invention without undue experimentation. For example, various statistical and other mathematical calculations and algorithms may be used to generate targeted advertisements.

As would be apparent to one reasonably skilled in the art, the invention may be applied to other manufacturing types, including but not limited to the manufacture of apparel. Both sheet metal and apparel designers use CAD systems to design their products, using sheets of flat material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. CAD programs may be used to visualize the shape of the finished product. In both sheet metal and apparel manufacturing the sheet (metal or fabric) may be cut or stamped by a variety of methods using computerized machines. Units may be moved from station to station during manufacture. Whereas sheet metal is typically connected by rivets or welding, sheet fabric is typically connected by stitching or gluing. Surface finishes may be applied to both; both may be painted, silk-screened, or otherwise covered with a protective substance.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory (ROM) device, a RAM device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
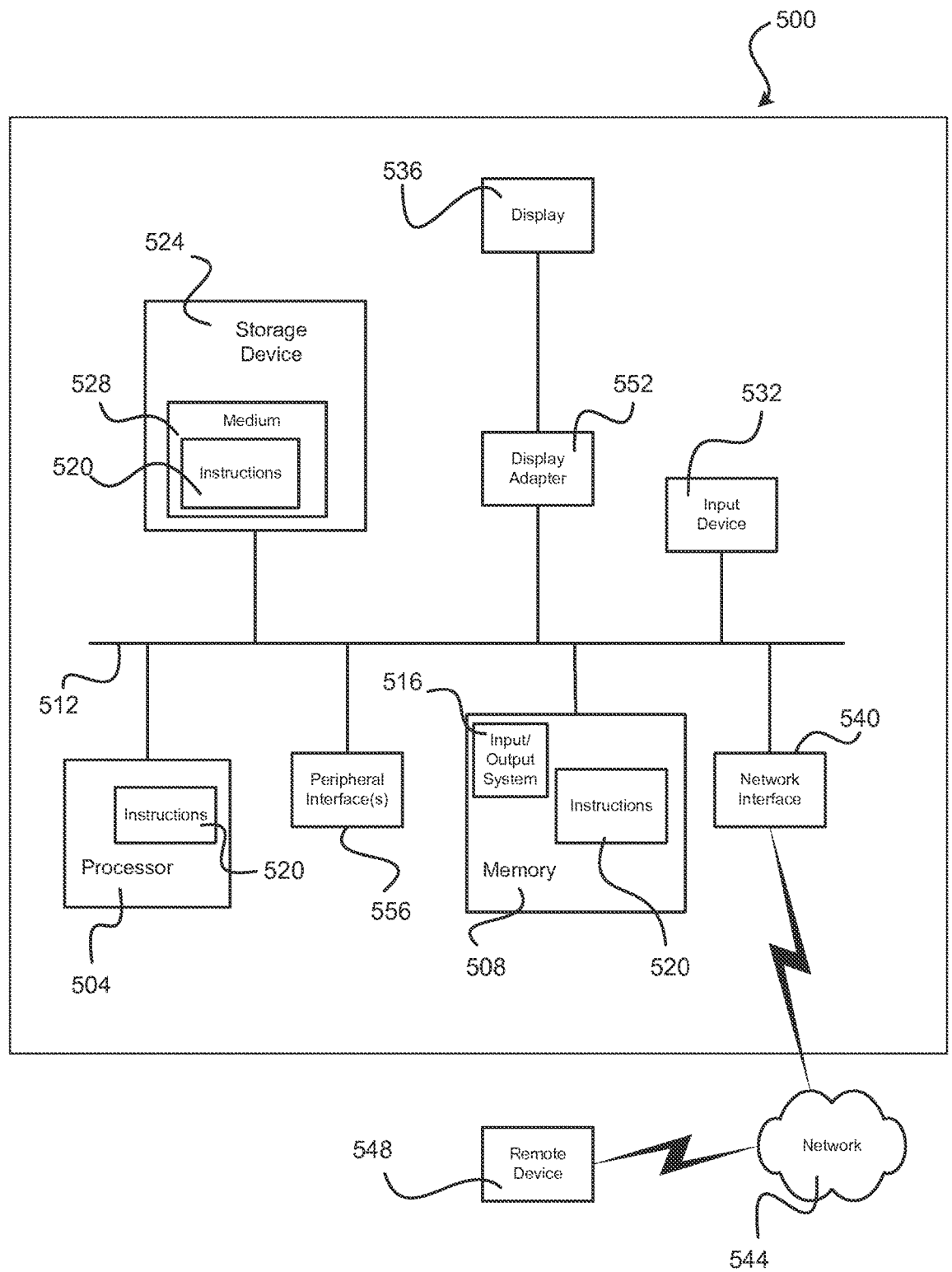
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system, such as the price-comparing system 200 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine readable media) including, but not limited to, a random access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing pricing requests in a computer-assisted design ("CAD") product program, the system comprising a computing device implementing the steps of:
   extracting, from a CAD program, at least a user action in the CAD program, wherein the at least a user action comprises at least a command to create a CAD model;
   analyzing, contents of a design document of the CAD program;
   identifying, in an advertisement trigger database linking user actions and design document contents to advertisement triggers, an advertisement trigger from the at least a user action in the CAD program and the contents of the design document;
   determining that the advertisement trigger exceeds a threshold stored in an advertisement event database linking advertisement triggers to advertisement types;
   selecting as a function of the at least a user action in the CAD program and the contents of the design document of the CAD program, from an advertisement database linking advertisement triggers to advertisement types, an advertisement type,
   wherein selecting the advertisement type further comprises:
      receiving user feedback regarding an advertisement, wherein receiving user feedback further comprises receiving passive user feedback regarding a previously displayed advertisement via an end-user interface; and
      selecting the advertisement type as a function of the user feedback;
   receiving, from an advertiser interface, a first advertisement as a function of the advertisement type, wherein the first advertisement is configured to assist the user with creating the CAD model;
   receiving, from the advertiser interface, at least one second advertisement, wherein the second advertisement includes an estimate of the price to fabricate the CAD model from at least one supplier of a plurality of suppliers; and
   displaying the first advertisement and the at least one second advertisement to the user in the CAD program, wherein displaying the first advertisement and the at least one second advertisement to the user in the CAD program comprises displaying the first advertisement and the at least one second advertisement in a dedicated display area of a user interface of the CAD program.

2. The system of claim 1, wherein receiving the user usage data further comprises storing at least a record describing the user usage data in a program usage database.

3. The system of claim 1, wherein the at least a user action in the CAD program further comprises at least a command to modify the CAD model represented in the CAD program.

4. The system of claim 1, wherein identifying the advertisement trigger further comprises storing, in a program usage database, a record associating the advertisement trigger with the user actions in the CAD program.

5. The system of claim 1, wherein identifying the advertisement trigger further comprises identifying two or more differing advertisement triggers from a single action indicated by the user actions in the CAD program.

6. The system of claim 5, wherein identifying the advertisement trigger further comprises analyzing the two or more differing advertisement triggers to determine a rank for at least one of the triggers, wherein said retrieving an advertisement includes retrieving an advertisement as a function of the rank for at least one of the triggers.

7. The system of claim 1, wherein identifying the advertisement trigger further comprises identifying two or more differing advertisement triggers from identical actions indicated by the user actions in the CAD program.

8. The system of claim 7, wherein identifying the advertisement trigger further comprises analyzing the two or more differing advertisement triggers to determine a rank for at least one of the triggers, wherein said retrieving an advertisement includes retrieving an advertisement as a function of the rank for at least one of the triggers.

9. The system of claim 1, wherein:
   the threshold includes an immediate advertisement time threshold; and
   determining that the advertisement trigger exceeds a threshold further comprises:
      recording a duration of the user action; and
      determining that the duration of the user action exceeds the immediate advertisement time threshold.

10. The system of claim 1, wherein:
   the threshold includes an immediate advertisement number threshold; and
   determining that the advertisement trigger exceeds a threshold further comprises:
      retrieving, from a program usage database, a plurality of records associated with user interaction with the CAD program;
      comprising generating a tally of occurrences of a plurality of like advertisement triggers using the plurality of records; and
      determining that the tally exceeds the immediate advertisement number threshold.

11. The system of claim 1, wherein:
   the threshold includes a total trigger time threshold; and
   determining that the advertisement trigger exceeds a threshold further comprises:
      retrieving, from a program usage database, a plurality of records associated with user interaction with the CAD program, wherein each record describes the advertising trigger and a duration of time associated with the advertising trigger;

calculating a total duration of time associated with the advertising trigger using the plurality of records; and determining that the total duration of time exceeds the total trigger time threshold.

12. The system of claim 1, wherein:

the threshold includes an immediate advertisement number threshold; and determining that the advertisement trigger exceeds a threshold further comprises:

retrieving, from a program usage database, a plurality of records associated with user interaction with the CAD program; and determining that the number of retrieved records exceeds the immediate advertisement number threshold.

13. The system of claim 1, wherein:

the threshold includes a total usage time threshold; and determining that the advertisement trigger exceeds a threshold further comprises:

retrieving, from a program usage database, a duration associated with an interaction between the user and the CAD program; and determining that the duration exceeds the total usage time threshold.

14. The system of claim 1, wherein selecting the advertisement type includes selecting an advertisement for instructional material relating to the user action.

15. The system of claim 1, wherein receiving the advertisement as a function of the advertisement type further comprises:

receiving a first advertisement from a first advertiser;

receiving a second advertisement from a second advertiser, wherein the second advertiser is distinct from the first advertiser;

storing a record in the advertisement event database linking the first advertisement to a first advertisement type; and storing a record in the advertisement event database linking the second advertisement to a second advertisement type.

16. The system of claim 1, wherein displaying the advertisement to the user in the CAD program further comprises:

performing an operation in the CAD program;

displaying a progress bar during the operation; and displaying the advertisement in the progress bar.

17. The system of claim 1 further comprising:

storing the advertisement in an advertisement journal database;

embedding the advertisement journal database in a CAD file generated by the CAD program;

transmitting the CAD file to at least a supplier;

selecting an advertisement for the supplier based on the CAD file; and presenting the advertisement for the supplier to the supplier.

\* \* \* \* \*